(12) United States Patent
Jang et al.

(10) Patent No.: US 7,784,998 B2
(45) Date of Patent: Aug. 31, 2010

(54) METHOD FOR LIQUID MIXING SUPPLY

(75) Inventors: Soo-Il Jang, ChonAn-shi (KR);
Kwang-Il Choi, ChonAn-shi (KR)

(73) Assignee: Semes Co., Ltd., Chonan-Shi, Chungcheongnam-Do (KR)

(*) Notice: Subject to any disclaimer, the term of this patent is extended or adjusted under 35 U.S.C. 154(b) by 935 days.

(21) Appl. No.: 11/377,870

(22) Filed: Mar. 17, 2006

(65) Prior Publication Data

US 2006/0209625 A1  Sep. 21, 2006

(30) Foreign Application Priority Data

Mar. 17, 2005  (KR) .................. 10-2005-0022323

(51) Int. Cl.
*B01F 3/08* (2006.01)
*B01F 15/04* (2006.01)

(52) U.S. Cl. ............... 366/150.1; 366/152.2; 366/162.1

(58) Field of Classification Search .............. 366/162.1, 366/150.1, 152.2
See application file for complete search history.

(56) References Cited

U.S. PATENT DOCUMENTS

| | | | |
|---|---|---|---|
| 4,362,033 A | | 12/1982 | Young |
| 5,470,150 A | * | 11/1995 | Pardikes ..................... 366/137 |
| 5,470,393 A | * | 11/1995 | Fukazawa ..................... 134/3 |
| 5,507,305 A | * | 4/1996 | Franklin ..................... 134/57 R |
| 5,722,441 A | * | 3/1998 | Teramoto ..................... 134/56 R |
| 5,800,056 A | * | 9/1998 | Suzuki et al. ............. 366/152.4 |
| 5,983,909 A | * | 11/1999 | Yeol et al. ................. 134/102.1 |
| 6,120,175 A | * | 9/2000 | Tewell ......................... 366/140 |
| 6,325,081 B1 | * | 12/2001 | Miki et al. ............... 134/102.1 |
| 6,444,010 B1 | * | 9/2002 | Watanabe ..................... 75/715 |
| 6,584,989 B2 | * | 7/2003 | Taft et al. ................. 134/100.1 |

(Continued)

FOREIGN PATENT DOCUMENTS

JP  10-335302  12/1998

(Continued)

OTHER PUBLICATIONS

Web.archive.org of http:/biology.kenyon.edu/courses/bio109/tetrahymena/serial—dilution2.htm as updated on Jul. 9, 2003, 1 page.*

(Continued)

*Primary Examiner*—Tony G Soohoo
(74) *Attorney, Agent, or Firm*—Harness, Dickey & Pierce, P.L.C.

(57) ABSTRACT

There is provided a method for liquid mixing supply fabricating a mixed etching solution in which sulfuric acid, hydrogen peroxide, ultra pure water and hydrofluoric act are mixed together. The method includes: supplying a specific liquid chemical to a mixing tank such that it is mixed in ppm units; and supplying at least two liquid chemicals and a ultra pure water to the mixing tank at a predetermined ratio, and mixing them, wherein starting points of supplying the at least two liquid chemicals and the ultra pure water are different from each other. Since the starting points of supplying the sulfuric acid, the hydrogen peroxide, and the ultra pure water are different, it is possible to minimize the heat generation due to the reaction between the sulfuric acid with the hydrogen peroxide.

13 Claims, 4 Drawing Sheets

U.S. PATENT DOCUMENTS

| | | | |
|---|---|---|---|
| 6,663,722 B1 * | 12/2003 | Higashino et al. | 134/26 |
| 6,764,967 B2 * | 7/2004 | Pai et al. | 438/787 |
| 7,063,455 B2 * | 6/2006 | Achkire et al. | 366/152.2 |
| 7,364,349 B2 * | 4/2008 | Achkire et al. | 366/152.2 |
| 2006/0209625 A1 * | 9/2006 | Jang et al. | 366/162.1 |

FOREIGN PATENT DOCUMENTS

| | | |
|---|---|---|
| JP | 2000-100765 | 4/2000 |
| JP | 2001-144083 | 5/2001 |
| JP | 2003-154243 | 5/2003 |

OTHER PUBLICATIONS

"Safety in Chemistry Laboratory, General Chemistry Lab Safety" from (http://chemlabs.uoregon.edu/Safety/GeneralInstructions.html) (as archived on Jan. 27, 1998, on web.archive.org). Total 2 pages.*

Jiang Zigang, "Preparation of the Standard Sample of Single Ion Trace Copper and Zinc in Water," *Bulletin Analysis & Testing*, vol. 2, Issue 3, p. 58, (Sep. 30, 1983) and English translation thereof.

* cited by examiner

Fig. 2

$\begin{pmatrix}\text{Mixing Ratio of}\\\text{Liquid Chemical}\end{pmatrix}$ Fixed Quantity of Mixing Tank : 20L $\begin{bmatrix}\text{1PPM = 0.02ml}\\\text{89PPM X 0.02ml = 1.78ml}\end{bmatrix}$

| Liquid Chemical | Sulfuric Acid | Hydrogen Peroxide | Ultra Pure Water | Hydrofluoric Acid |
|---|---|---|---|---|
| Ratio | 3 | 7 | 50 | 89PPM |
| Flow Rate | 1000ml | 2333ml | 16,665.22ml | 1.78ml |

| Mixing Ratio of Liquid Chemical | Fixed Quantity of Mixing Tank : 20L [1PPM = 0.02ml; 89PPM X 0.02ml = 1.78ml] | | | |
|---|---|---|---|---|
| Liquid Chemical | Sulfuric Acid | Hydrogen Peroxide | Ultra Pure Water | Hydrofluoric Acid |
| Ratio | 3 | 7 | 50 | 89PPM |
| Flow Rate | 1000ml | 2333ml | 16,665.22ml | 1.78ml |

METHOD FOR LIQUID MIXING SUPPLY

PRIORITY STATEMENT

This application claims benefit of priority under 35 USC §119 from Korean Patent Application No. 10-2005-0022323, filed on Mar. 17, 2005, in the Korean Intellectual Property Office, the contents of which are incorporated herein by reference in its entirety.

BACKGROUND OF THE INVENTION

1. Field of the Invention

The present invention relates to a method for liquid mixing supply in a semiconductor fabrication process, and more particularly, to a method for liquid mixing supply in a semiconductor fabrication process for fabricating a mixed etching solution in which sulfuric acid, hydrogen peroxide, ultra pure water, and hydrofluoric acid are mixed together.

2. Description of the Related Art

In a semiconductor fabrication process, as a semiconductor device is highly integrated, an importance of an etching and a cleaning process is increasingly recognized. A current tendency is that a particle management standard becomes stricter and stricter and thus, it is essentially required to optimize the cleaning process for micro-contamination such as organic contamination, inorganic contamination, metallic contamination, or the like. Recently, the kind of chemical solution, e.g., liquid chemical, used in the etching and cleaning process becomes more and more various. A mixed solution in which various kinds of chemical solution are mixed is used for an effective and optimized process.

Therefore, an apparatus of fabricating a semiconductor device requires specific conditions and management adaptive for supplying each liquid chemical. Particularly, in a liquid mixing supply apparatus for supplying a mixed solution in which various kinds of liquid chemical are mixed together, it is required precise controls such as a mixing of each liquid chemical at a fixed ratio, concentration relationship according to the mixing, a supply amount, etc.

FIG. 4 is a schematic view illustrating a conventional liquid mixing supply apparatus 10 used in a semiconductor spin etching process.

Referring to FIG. 4, there is schematically shown an apparatus for supplying a mixed solution to a processing unit, wherein the mixed solution is prepared by mixing a sulfuric acid, a hydrogen peroxide, a ultra pure water, and a hydrofluoric acid at a predetermined ratio, e.g., sulfuric acid:hydrogen peroxide:ultra pure water:hydrofluoric acid=3:7:50:89 ppm. In the liquid mixing supply apparatus 10, the ultra pure water, the sulfuric acid, the hydrogen peroxide, and the hydrofluoric acid are supplied in a fixed quantity to a mixing tank 14 by controlling a flow rate control unit 18 which is installed on a supply pipe 16 between each of liquid supply units 12a to 12d and the mixing tank 14. Herein, the flow rate control unit 18 is configured as a flowmeter, a valve, or the like.

Meanwhile, the conventional liquid mixing supply apparatus 10 can supply the liquid chemical in a fixed quantity using a typical flow rate control unit when intending to supply large quantity of ultra pure water, sulfuric acid, and hydrogen peroxide. However, it is difficult to precisely supply hydrofluoric acid in a fixed quantity using the typical flow rate control unit because the supply amount of the hydrofluoric acid is extremely small, i.e., 89 ppm (flow rate is 1.78 ml).

Therefore, the conventional liquid mixing supply apparatus 10 has problems of precision and reproducibility in adding a specific liquid chemical with an extremely small quantity into the mixed solution in which at least two kinds of liquid chemical are mixed together.

Moreover, since a heat is inevitably generated due to a chemical reaction of liquid chemicals while the sulfuric acid, the hydrogen peroxide, and the ultra pure water are supplied to the mixing tank 14, the conventional liquid mixing supply apparatus 10 should employ a cooler on a circulation line separately for cooling a process liquid, i.e., the mixed solution.

SUMMARY OF THE INVENTION

The present invention provides a method for liquid mixing supply capable of preventing a heat from being generated in mixing several kinds of liquid chemical.

The preset invention also provides a method for liquid mixing supply capable of uniformly supplying a specific liquid chemical with an extremely small quantity to a mixed solution in which at least two kinds of liquid chemical are mixed together.

Embodiments of the present invention provide methods for liquid mixing supply including: supplying a specific liquid chemical to a mixing tank such that it is mixed in ppm units; and supplying at least two liquid chemicals and a ultra pure water to the mixing tank at a predetermined ratio, and mixing them, wherein starting points of supplying the at least two liquid chemicals and the ultra pure water are different from each other.

In some embodiments, in the supplying of the at least two liquid chemicals and the ultra pure water, the at least two liquid chemicals and the ultra pure water are sequentially supplied in a descending order of a supply amount or a supply ratio.

In other embodiments, in the supplying of the at least two liquid chemicals and the ultra pure water, the starting points of supplying the at least two liquid chemicals and the ultra pure water are different from each other but finishing points of supplying them are equal to each other.

In further embodiments, the at least two liquid chemicals include a hydrogen peroxide and sulfuric acid, and the liquid chemicals are supplied to the mixing tank in order of the specific liquid chemical, the ultra pure water, the hydrogen peroxide and the sulfuric acid.

In yet other embodiments, the supplying of the specific liquid chemical includes: diluting the specific liquid chemical with a ultra pure water; and supplying the diluted specific liquid chemical solution to the mixing tank.

In yet further embodiments, the supplying of the diluted specific liquid chemical solution includes: setting a flow rate of the diluted specific liquid chemical solution to be supplied to the mixing tank according to a ratio of the specific liquid chemical diluted in the ultra pure water; and supplying the diluted specific liquid chemical solution to the mixing tank at the set flow rate through a flow rate control unit.

In some embodiments, the specific liquid chemical is a hydrofluoric acid.

In other embodiments of the present invention, there are provided methods of liquid mixing supply including supplying a plurality of liquid chemicals and a ultra pure water to a mixing tank at a predetermined ratio, and mixing them, wherein starting points of supplying the plurality of liquid chemicals and the ultra pure water are different from each other In further embodiments, one of the plurality of liquid chemicals is a diluted hydrofluoric acid solution, and the diluted hydrofluoric acid solution is supplied first than the ultra pure water and the plurality of liquid chemicals except the diluted hydrofluoric acid solution.

In yet other embodiments, the ultra pure water and the plurality of liquid chemicals except the diluted hydrofluoric acid solution are sequentially supplied in a descending order of a supply amount or a supply ratio, and finishing points of supplying them are equal.

In yet further embodiments, the hydrofluoric acid with an extremely small quantity is mixed in ppm units into the mixing tank.

In some embodiments, the mixing of the hydrofluoric acid with the extremely small quantity into the mixing tank includes: diluting the hydrofluoric acid with the ultra pure water at a predetermined ratio to fabricate the diluted hydrofluoric acid solution; and supplying the diluted hydrofluoric acid solution to the mixing tank.

In other embodiments, the supplying of the diluted hydrofluoric acid solution to the mixing tank includes: setting a flow rate of the diluted specific liquid chemical solution to be supplied to the mixing tank according to a ratio of the specific liquid chemical diluted in the ultra pure water; and supplying the diluted specific liquid chemical solution to the mixing tank at the set flow rate through a flow rate control unit.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 2 is a table illustrating a mixing ratio of liquid chemicals according to the preferred embodiment of the present invention;

DETAILED DESCRIPTION OF THE INVENTION

Figure 1:
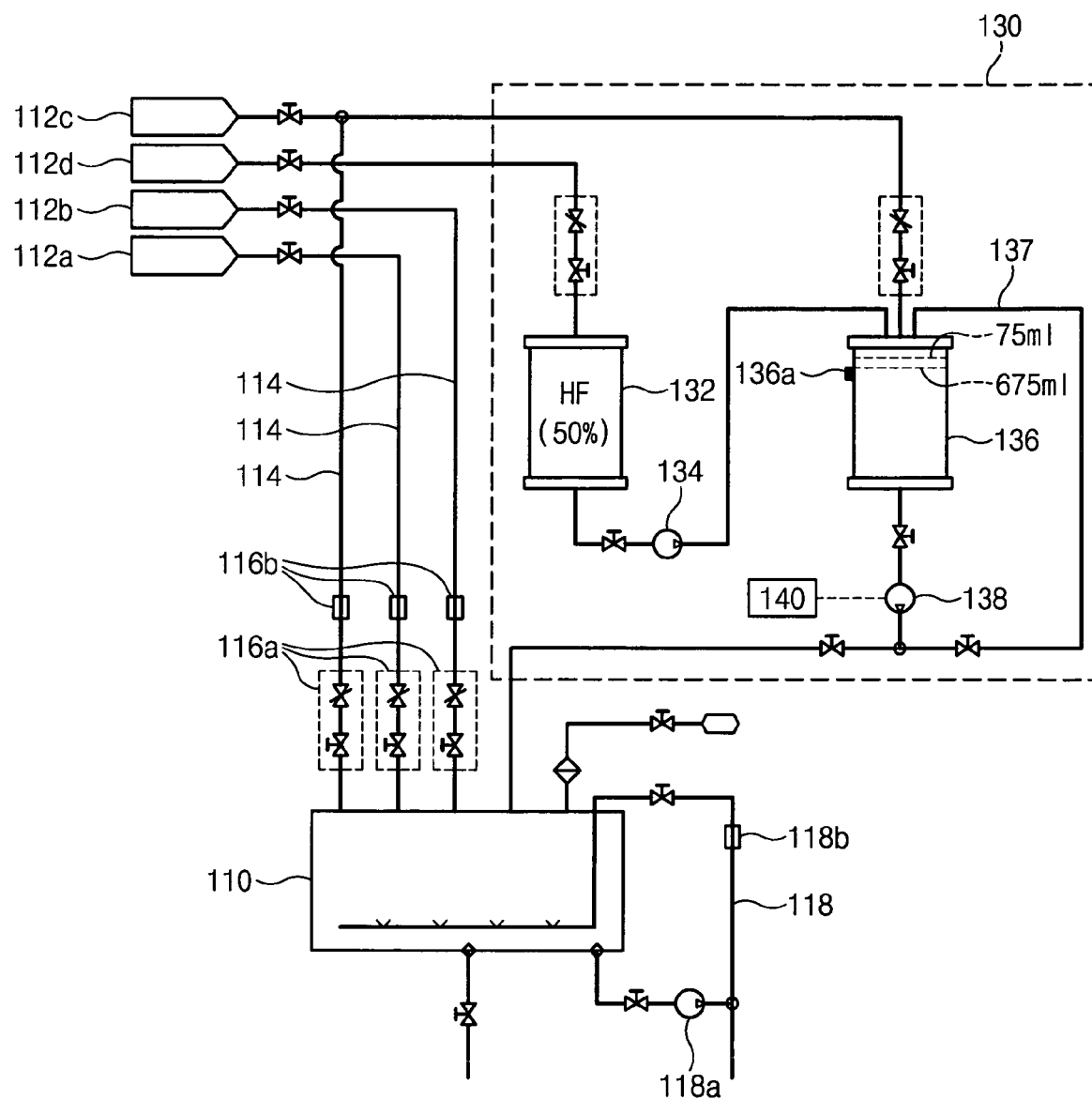
FIG. 1 is a schematic view of a liquid mixing supply apparatus according to a preferred embodiment of the present invention.

The present invention will now be described hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention. Throughout the specification, like reference numerals denote like elements.

Referring to FIG. 1, a liquid mixing supply apparatus 100 according to the present invention is an apparatus for supplying a mixed solution to a processing unit in an etching process such as a spin etching process of a spin etcher or a cleaning process of a wet station, wherein the mixed solution is prepared by mixing a ultra pure water and various kinds of liquid chemicals at a predetermined ratio.

The liquid mixing supply apparatus 100 includes a mixing tank 110 and a micro-amount supply unit 130.

A sulfuric acid, a hydrogen peroxide, a ultra pure water and a hydrofluoric acid are supplied to the mixing tank at each fixed flow rate so that an etching solution is fabricated. In the embodiment, the liquid chemicals may be mixed at a predetermined mixing ratio as illustrated in a table of FIG. 2.

The sulfuric acid, the hydrogen peroxide, and the ultra pure water are supplied to the mixing tank 110 through respective supply pipes 114 from respective sources 112a, 112b and 112c in sequence. Each flow rate of the sulfuric acid, the hydrogen peroxide, and the ultra pure water supplied to the mixing tank 110 is controlled by a flow rate control valve 116a and a flowmeter 116b which are installed on the respective supply pipes 114. Herein, reference numerals 118, 118a and 118b denote a circulation line, a circulation pump, and liquid chemical concentration meter, respectively.

Each starting point of supplying the sulfuric acid, the hydrogen peroxide, and the ultra pure water are differently controlled. That is, the sulfuric acid, the hydrogen peroxide, and the ultra pure water are supplied to the mixing tank 110 in a descending order of the supply amount (supply ratio). However, it is preferable that respective finishing points of supplying them are equal. The liquid chemicals are supplied to the mixing tank 110 in order of the ultra pure water, the hydrogen peroxide, and the sulfuric acid. Exceptionally, the hydrofluoric acid is supplied to the mixing tank 110 first of all regardless of the supply amount because it is supplied with an extremely small quantity.

The hydrofluoric acid is supplied to the mixing tank 110 through the micro-amount supply unit 130, wherein the supply amount of the hydrofluoric acid is extremely small. Therefore, in order to increase mixibility with the other liquid chemicals, it is preferable that the hydrofluoric acid should be supplied to the mixing tank 110 first before supplying the sulfuric acid, the hydrogen peroxide, and the ultra pure water to the mixing tank 110. On the contrary, if the hydrofluoric acid is supplied to the mixing tank 110 after supplying the other liquid chemicals, it takes two times longer than the mixing time when the hydrofluoric acid is supplied first.

The micro-amount supply unit 130, which supplies the hydrofluoric acid with the extremely small quantity in ppm units, includes a first metering tank 132, a second metering tank 136, a first metering pump 134, a second metering pump 138 and a second controller 140. The hydrofluoric acid supplied from the hydrofluoric acid source 112d is filled into the first metering tank 132. The hydrofluoric acid supplied from the hydrofluoric acid source 112d contains 50% undiluted hydrofluoric acid. The ultra pure water is filled up to a predetermined quantity into the second metering tank 136. The first metering pump 134 pumps the hydrofluoric acid in the first metering tank 132 to supply it to the second metering tank 136 with a predetermined quantity. Resultingly, a diluted hydrofluoric acid solution, e.g., 5% diluted hydrofluoric acid solution, in which the hydrofluoric acid and the ultra pure water are mixed together, is fabricated in the second metering tank 136. A circulation line 137 is connected to the second metering tank 136 for mixing the ultra pure water and the hydrofluoric acid. The second metering tank 138 pumps the diluted hydrofluoric acid solution with a predetermined quantity in the second metering tank 136 and supplies it to the mixing tank 110. Herein, the controller 140 controls the second metering pump 138 by setting the flow rate of the diluted hydrofluoric acid to be supplied to the mixing tank 110 in advance according to the ratio of the hydrofluoric acid diluted in the ultra pure water, i.e., the concentration of the hydrofluoric acid with respect to the diluted hydrofluoric acid solution.

The liquid mixing supply apparatus 100 having the above constitution can precisely supply the hydrofluoric acid in ppm units to the mixing tank 110.

A method for liquid mixing supply using the liquid mixing supply apparatus 100 will be illustrated herebelow.

Figure 3:
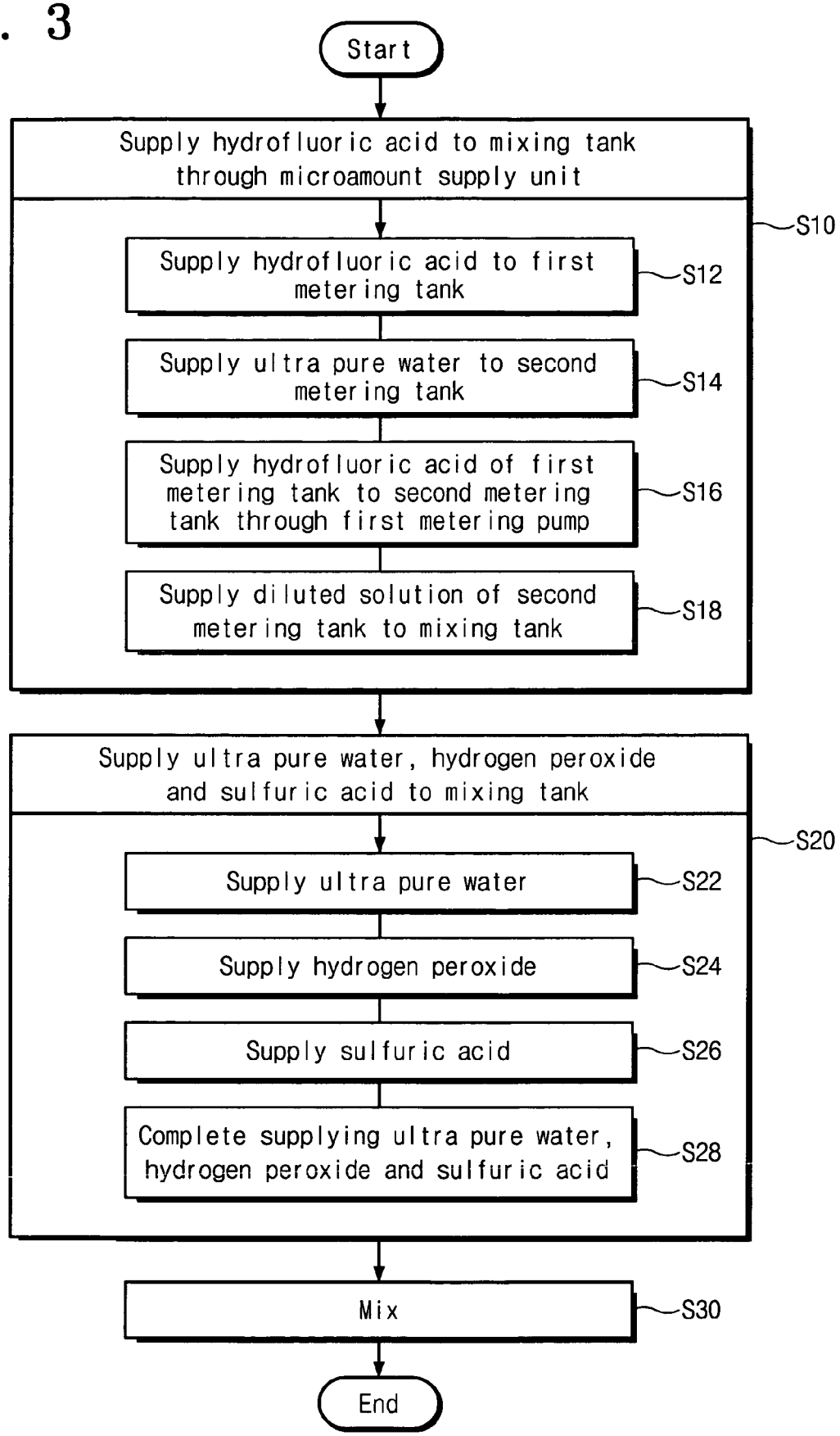
FIG. 3 is a flowchart illustrating a mixing procedure of the liquid chemicals in the liquid mixing supply apparatus according to the preferred embodiment of the present invention.
Figure 4:
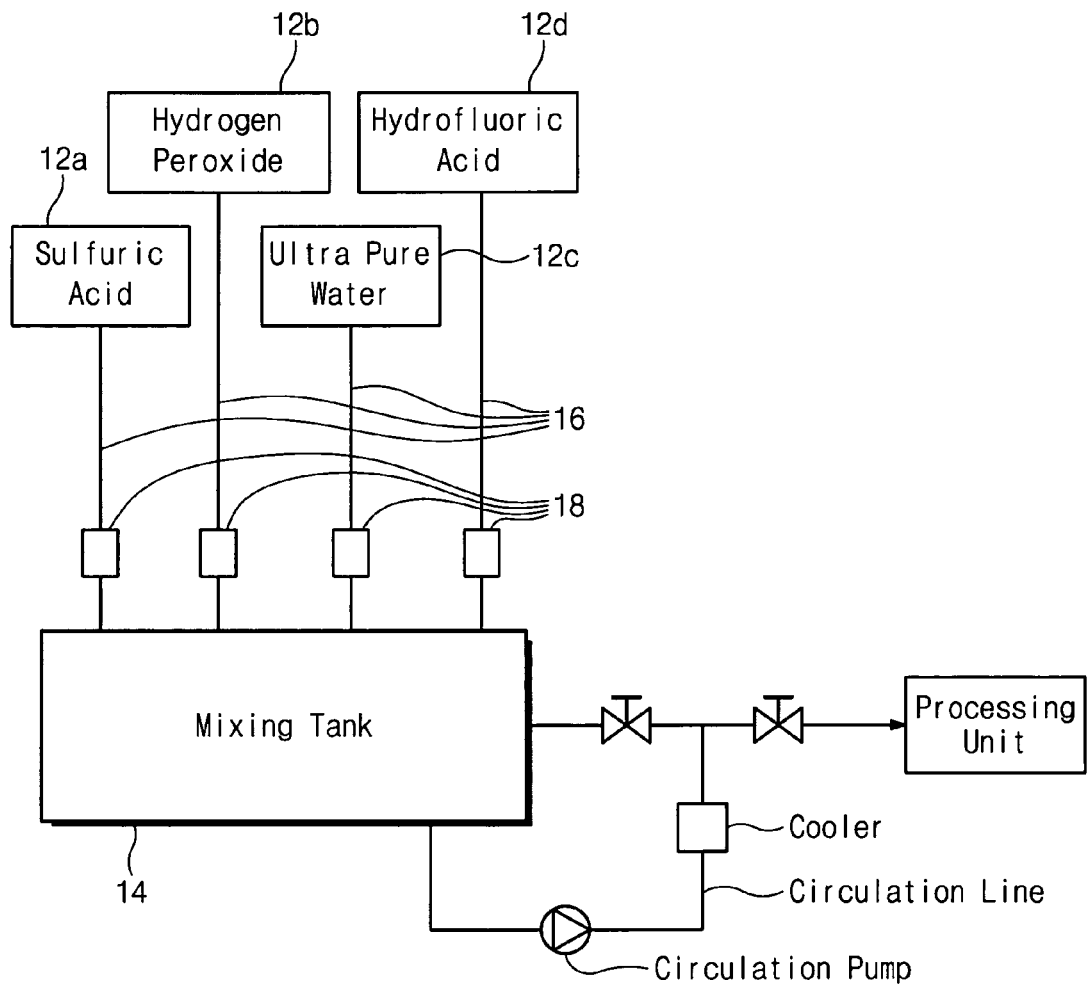
FIG. 4 is a schematic view illustrating a conventional liquid mixing supply apparatus used in a semiconductor spin etching process.

Referring to FIGS. 1 to 3, the inventive method for liquid mixing supply includes: supplying the hydrofluoric acid with the extremely small quantity to the mixing tank 110 (S10); supplying the ultra pure water, the hydrogen peroxide, and the sulfuric acid at a fixed ratio (See table of FIG. 2) to the mixing tank 110 (S20); and mixing the liquid chemicals by circulation through the circulation line 137 (S30).

The operation S10 is performed to additionally supply the hydrofluoric acid with the amount of 89 ppm, i.e., the hydrofluoric acid at a flow rate of 1.78 ml, to the 20 L-mixing tank 110, as illustrated in table of FIG. 2. For reference, since 1 ppm is converted into flow rate of 0.02 ml if using the 20 L mixing tank 110, 89 ppm is converted into the flow rate of 1.78 ml. The supplying of the hydrofluoric acid is performed through the micro-amount supply unit 130.

The operation S10 will be more fully described in detail herebelow. To begin with, 50% hydrofluoric acid is filled into the first metering tank 132 (S12). Thereafter, 675 ml ultra pure water is filled into the second metering tank 136, and a level sensor 136a senses whether or not the fixed quantity is filled into the second metering tank 136 (S14). Afterwards, 75 ml of 50% hydrofluoric acid solution, i.e., 37.5 ml of the undiluted hydrofluoric acid, filled into the first metering tank 132 is supplied to the second metering tank 136 by the first metering pump 134. Therefore, the 75 ml of 50% hydrofluoric acid is diluted with the 675 my ultra pure water so that 5% diluted hydrofluoric acid solution (5% DHF) is fabricated (S16). The 5% diluted hydrofluoric acid solution (total diluted hydrofluoric acid solution:hydrofluoric acid=100:5) fabricated at the second metering tank 136 is supplied to the mixing tank 110 by the second metering pump 138 (S18). The controller 140 sets a flow rate x of the diluted hydrofluoric acid solution which will be supplied to the mixing tank 110 according to ratio between the hydrofluoric acid and the diluted hydrofluoric acid solution, i.e., the concentration of the hydrofluoric acid. After setting the flow rate x, the diluted hydrofluoric acid solution is supplied to the mixing tank 110 at the set flow rate x through the second metering pump 138.

The flow rate x of the diluted hydrofluoric acid solution will be calculated and set according to an equation 1 below.

$$750 \text{ ml (diluted hydrofluoric acid solution)}:37.5 \text{ ml (hydrofluoric acid)}=x:1.78 \text{ ml (flow rate of hydrofluoric acid in etching solution)} \quad \text{(Eq. 1)}$$

Thus, $x=(750\times1.78)\div37.5=35.6$ ml.

The flow rate of the diluted hydrofluoric acid solution supplied to the mixing tank 110 is 35.6 ml so that 1.78 ml hydrofluoric acid is supplied to the mixing tank 110. Provided that the hydrofluoric acid ratio of the diluted hydrofluoric acid solution is 1% in the second metering tank 136, it is preferable to supply 178 ml diluted hydrofluoric acid solution to the mixing tank 110. Through these processes, the hydrofluoric acid is supplied to the mixing tank 110 through the micro-amount supply unit 130 by a measured amount.

Meanwhile, the sulfuric acid, the hydrogen peroxide and the ultra pure water are supplied to the mixing tank 110 through the supply pipes 114 connected to the respective sources 112a, 112b and 112c at each flow rate (S20). Since the mixing tank 110 has a fixed quantity of 20 L, 16,631.4 ml ultra pure water, 1,000 ml sulfuric acid and 2333 ml hydrogen peroxide are supplied to the mixing tank 110. Each flow rate of the liquid chemicals, i.e., the sulfuric acid, the hydrogen peroxide and the ultra pure water, supplied to the mixing tank 110 is controlled through the flow rate control valve 116a and the flowmeter 116b which are installed on the respective supply pipes. Herein, starting points of supplying the sulfuric acid, the hydrogen peroxide and the ultra pure water are differently controlled (S22, S24 and S26). That is, the sulfuric acid, the hydrogen peroxide, and the ultra pure water are supplied to the mixing tank 110 in a descending order of the supply amount (supply ratio). However, it is preferable that finishing points of supplying them are equal to one another (S28). The liquid chemicals are supplied to the mixing tank 110 in order of the ultra pure water, the hydrogen peroxide, and the sulfuric acid, and thus it is possible to minimize heat generation due to chemical reaction by reducing the mixing time of the sulfuric acid with the hydrogen peroxide.

Finally, 1.78 ml hydrofluoric acid, 1,000 ml sulfuric acid, 2333 ml hydrogen peroxide and 16,631.4 ml+33.82 ml ultra pure water are supplied to the mixing tank 110, and they circulate through the circulation line and are mixed together (S30).

As described above, according to the present invention, since the starting points of supplying the sulfuric acid, the hydrogen peroxide, and the ultra pure water are differently controlled, it is possible to minimize the heat generation due to the mixing of the sulfuric acid with the hydrogen peroxide. In addition, a specific liquid chemical with an extremely small quantity, e.g., ppm units, is precisely added into the mixed solution in which at least two kinds of liquid chemicals are mixed. Resultingly, it is possible to secure the precision and reproducibility in mixing and supplying various kinds of liquid chemicals to the mixing tank.

It will be apparent to those skilled in the art that various modifications and variations can be made in the present invention. Thus, it is intended that the present invention covers the modifications and variations of this invention provided they come within the scope of the appended claims and their equivalents.

What is claimed is:

1. A method for liquid mixing supply comprising:
forming a diluted specific liquid chemical;
supplying the diluted specific liquid chemical to a mixing tank; and
supplying at least two liquid chemicals and ultra pure water to the mixing tank at a predetermined ratio, and mixing them, wherein
starting points of supplying the at least two liquid chemicals and the ultra pure water are different from each other,
forming the diluted specific liquid chemical includes supplying a specific liquid chemical to a first tank, supplying first ultra pure water to a second tank such that the first ultra pure water supplied to the second tank has not mixed with the specific liquid chemical, transferring the specific liquid chemical to the second tank to mix the specific liquid chemical with the first ultra pure water to form the diluted specific liquid chemical, and
in the supplying of the at least two liquid chemicals and the ultra pure water, the at least two liquid chemicals and the ultra pure water are sequentially supplied in a descending order of a supply amount or a supply ratio.

2. The method of claim 1, wherein, in the supplying of the at least two liquid chemicals and the ultra pure water, the starting points of supplying the at least two liquid chemicals and the ultra pure water are different from each other but finishing points of supplying them are equal to each other.

3. The method of claim 1, wherein the at least two liquid chemicals include a hydrogen peroxide and sulfuric acid, the liquid chemicals and the ultra pure water being supplied to the mixing tank in order of the ultra pure water, the hydrogen peroxide and the sulfuric acid.

4. The method of claim 1, wherein the supplying of the diluted specific liquid chemical solution comprises:
    setting a flow rate of the diluted specific liquid chemical solution to be supplied to the mixing tank according to a ratio of the specific liquid chemical diluted in the ultra pure water; and
    supplying the diluted specific liquid chemical solution to the mixing tank at the set flow rate through a flow rate control unit.

5. The method of claim 1, wherein the specific liquid chemical is a hydrofluoric acid.

6. The method of claim 1, wherein mixing the specific liquid chemical, the at least two liquid chemicals, and the ultra pure water includes mixing the specific liquid chemical, the at least two liquid chemicals, and the ultra pure water through a circulation line.

7. The method of claim 1, wherein
    supplying the at least two liquid chemicals and ultra pure water to the mixing tank at a predetermined ratio includes flowing the ultra pure water from an ultra pure water source to the mixing tank, and
    supplying the first ultra pure water to a second tank includes flowing the first ultra pure water from the ultra pure water source to the second tank.

8. A method of liquid mixing supply comprising:
    forming a diluted hydrofluoric acid solution by supplying hydrofluoric acid to a first tank, supplying a first ultra pure water to a second tank such that the first ultra pure water supplied to the second tank has not mixed with the hydrofluoric acid, transferring the hydrofluoric acid from the first tank to the second tank to mix the first ultra pure water with the hydrofluoric acid; and
    supplying the diluted hydrofluoric acid solution, a plurality of liquid chemicals, and a second ultra pure water to a mixing tank at a predetermined ratio, and mixing them, wherein starting points of supplying the diluted hydrofluoric acid solution, the plurality of liquid chemicals and the second ultra pure water are different from each other and the diluted hydrofluoric acid solution is supplied to the mixing tank before the second ultra pure water and the plurality of liquid chemicals, and the second ultra pure water and the plurality of liquid chemicals except the diluted hydrofluoric acid solution are supplied in a descending order of a supply amount or a supply ratio, and finishing points of supplying them are equal.

9. The method of claim 8, wherein the diluted hydrofluoric acid with an extremely small quantity is mixed into the mixing tank.

10. The method of claim 8, wherein supplying the diluted hydrofluoric acid solution to the mixing tank comprises:
    setting a flow rate of the diluted hydrofluoric acid solution to be supplied to the mixing tank according to a ratio of the hydrofluoric acid diluted in the ultra pure water; and
    supplying the diluted hydrofluoric acid solution to the mixing tank at the set flow rate through a flow rate control unit.

11. The method of claim 8, wherein the first tank is a metered tank, the second tank is a metered tank, and the first pump is a metered pump.

12. The method of claim 8, further comprising:
    mixing the diluted hydrofluoric acid solution in a circulation line before supplying the diluted hydrofluoric acid solution to the mixing tank.

13. The method of claim 8, wherein
    supplying the first ultra pure water to the second tank includes flowing the first ultra pure water from an ultra pure water source to the second tank, and
    supplying the diluted hydrofluoric acid solution, the plurality of liquid chemicals, and the second ultra pure water to the mixing tank includes flowing the second ultra pure water from the ultra pure water source to the mixing tank.

\* \* \* \* \*